April 23, 1935.  H. A. FLOGAUS  1,998,713
REAR END DRIVE
Filed Feb. 16, 1934

Inventor
Howard A. Flogaus
By Blackmore, Spencer & Hill
Attorney

Patented Apr. 23, 1935

1,998,713

UNITED STATES PATENT OFFICE 1,998,713

REAR END DRIVE

Howard A. Flogaus, Ferndale, Mich., assignor to Yellow Truck and Coach Manufacturing Company, Pontiac, Mich., a company of Maine Application February 16, 1934, Serial No. 711,490

1 Claim. (Cl. 180—70)

This invention has to do with motor vehicles, and more particularly to an improved and compact grouping of the bulky propelling mechanism required to drive large and heavy duty vehicles, such as buses.

It is important in passenger coach design to arrange the driving elements so as not to occupy space which otherwise would be available for pay load, and with this in mind it is proposed in a street car type road vehicle, having its dash at the forward end and its floor extending substantially from front to rear, to mount the power plant under a transverse seat extending entirely across the vehicle body and backing against the rear wall. Vehicles of the kind mentioned are known in the art, but the present invention differs therefrom in that it contemplates in a specific embodiment an improved arrangement of parts which for the most part are conventional structures in general use, the arrangement being such as to impart the drive to the wheels through a short length propeller shaft connecting the differential mechanism between the wheels to the power output shaft of the power plant at a point intermediate the ends of the power plant unit, which, because of the large power output required to drive the vehicle, is necessarily long and extends almost from side to side of the vehicle, so that clearance is not available behind the wheels to take the drive off the end of the unit without resort to expensive expedients. Accordingly, the change speed mechanism, joined as a unit and in alined succession with the clutch and the engine, is provided with spaced parallel input and output shafts, and the output shaft is geared at its inner end with a universally jointed drive shaft extending longitudinally of the vehicle to the drive axle differential mechanism, which preferably is offset laterally from the vehicle center line in line with the propeller shaft to avoid propeller shaft angularity as much as possible.

Figure 1:
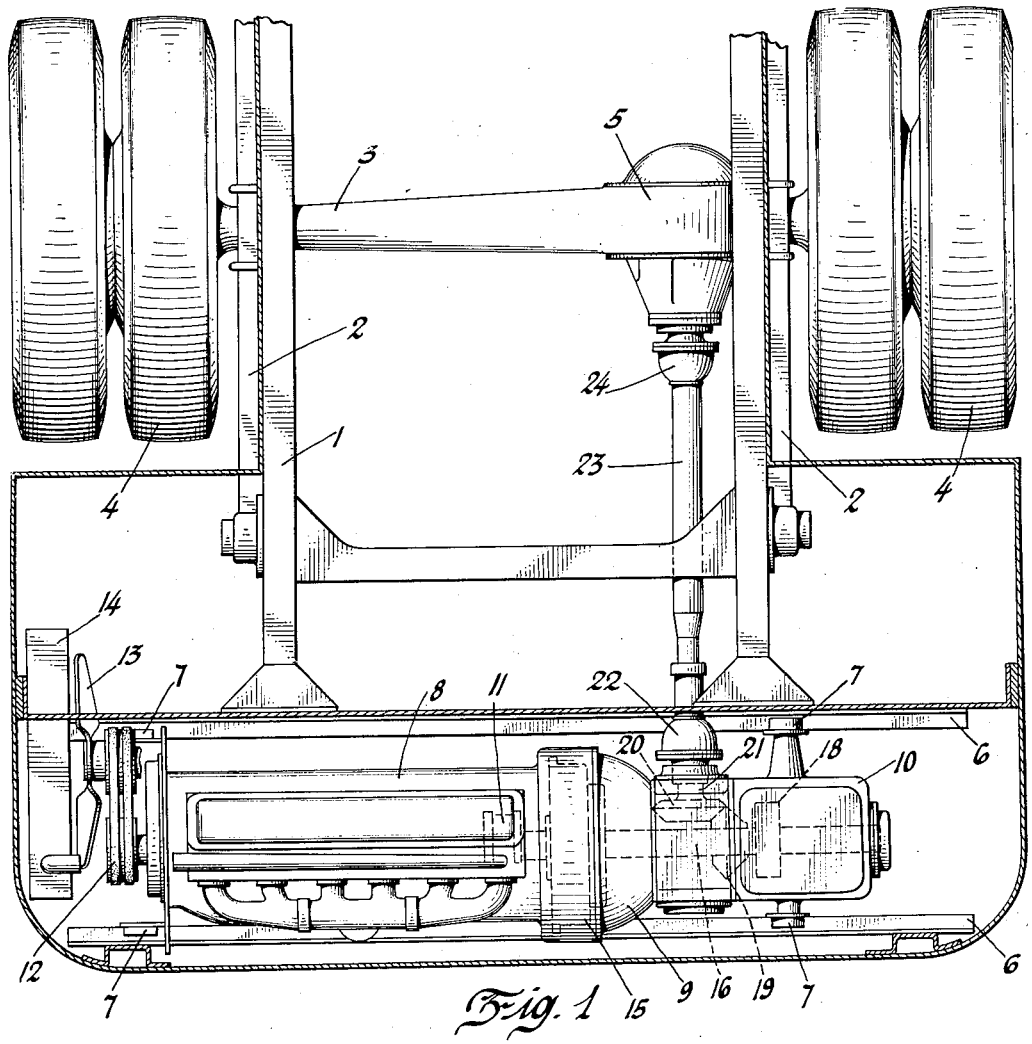
Figure 2:
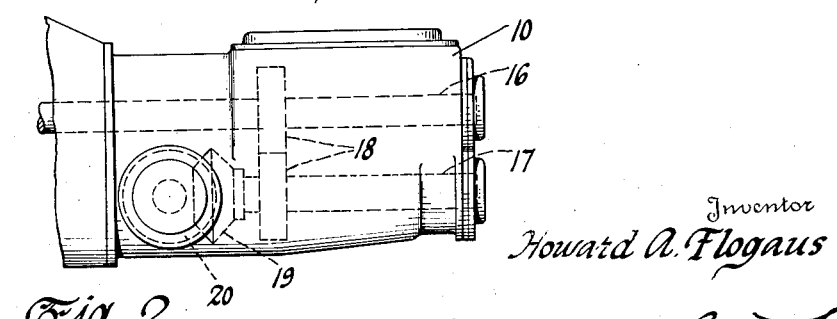

In the accompanying drawing, Figure 1 is a plan view of the rear portion of a vehicle chassis frame and the embodiment of the invention in the vehicle, and Figure 2 is a fragmentary side elevation of the change speed gear box.

Referring to the drawing, the chassis frame 1 is supported at each side by springs 2 upon an axle 3 carrying drive wheels 4 at opposite ends. For the purposes of illustration, a live axle is used, which embodies differential mechanism housed within an enlargement 5 of the axle and located to one side of the vehicle center line.

At the rear of the chassis frame, and as a part of the body supported by the frame, there is provided a compartment for the power plant, and the top wall of this compartment may support the cushion of a passenger seat within the body. Mounted within the engine compartment are a pair of spaced transverse rails 6—6 upon which the power plant is removably supported through a series of rollers 7, located at convenient points along the opposite sides of the unit. It will be noted that the power plant comprising the engine 8, the bell housing 9 and the gear box 10, joined together in alined succession, is of a length substantially corresponding to the width of the vehicle with its opposite ends in line with the road wheels 4—4.

At one end the engine crank shaft, a portion of which is shown by dotted lines at 11, drives through a suitable belt 12, a fan 13, for effecting flow of air through the cooling radiator 14 forming a part of the engine cooling system. The opposite end of the crank shaft drives through suitable clutch mechanism 15, an alined shaft 16, which constitutes the input shaft of the change speed mechanism. The input shaft 16 and the output shaft 17 are mounted in the housing 10 for rotation about vertically spaced parallel axes and carry suitable gearing for driving one from the other. For the sake of simplicity, a single set of relatively shiftable gears 18 is illustrated, and it will be understood that any convenient mechanism for effecting various changes in speed may be provided.

Instead of transferring the drive from the outer end of the output shaft, it is here proposed to mount a bevel gear 19 or the like upon the end of the output shaft between the change speed gears and the clutch mechanism, and to have the drive gear 19 in mesh with a driven bevel gear 20 on a stub shaft 21 extending in a direction at right angles to the engine shaft and having a bearing in the side wall of the gear box 10. This stub shaft 21 may be connected through a universal joint 22 with a longitudinally extending propeller or drive shaft 23 connected to the universal joint 24 which is connected with the differential mechanism enclosed within the housing 5 and in longitudinal alinement with the axis of the driven gear 20.

I claim:

In a motor vehicle, a power plant forming a part of the sprung weight of the vehicle and comprising an engine, a clutch, a transfer box and variable speed gearing arranged in transverse alinement successively at the rear of the vehicle, said variable speed gearing having input and output shafts arranged in spaced parallelism, with the input shaft extending through the transfer box between the clutch and variable speed gearing and the spaced output shaft terminating in said box for drive connection through the side thereof, a pair of driving wheels immediately forward of the power plant, differential drive mechanism between said wheels in longitudinal alinement with said transfer box, and forming a part of the unsprung weight of the vehicle, a short length propeller shaft extending longitudinally of the vehicle and drive connecting the differential mechanism with the transfer box end of said output shaft and a universal joint associated with the propeller shaft to accommodate relative movement between the sprung and unsprung weights.

HOWARD A. FLOGAUS.